(12) United States Patent
Rolf

(10) Patent No.: US 9,178,926 B2
(45) Date of Patent: *Nov. 3, 2015

(54) DIGITAL MEDIA DISTRIBUTION SYSTEM AND METHOD

(71) Applicant: GoFigure Media, LLC, Paola, KS (US)

(72) Inventor: Devon A. Rolf, Paola, KS (US)

(73) Assignee: GoFigure Media, LLC, Paola, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,648

(22) Filed: Aug. 11, 2014

(65) Prior Publication Data

US 2015/0019693 A1    Jan. 15, 2015

Related U.S. Application Data

(63) Continuation of application No. 13/679,295, filed on Nov. 16, 2012, now Pat. No. 8,843,947, which is a continuation of application No. 11/437,121, filed on May 18, 2006, now Pat. No. 8,385,912, which is a continuation of application No. 09/721,120, filed on Nov. 22, 2000, now Pat. No. 7,065,342.

(60) Provisional application No. 60/167,179, filed on Nov. 23, 1999.

(51) Int. Cl.
| | |
|---|---|
| *H04N 21/254* | (2011.01) |
| *H04N 21/41* | (2011.01) |
| *H04N 21/81* | (2011.01) |
| *H04L 29/06* | (2006.01) |
| *G06F 17/30* | (2006.01) |
| *G06Q 30/02* | (2012.01) |
| *G06Q 30/06* | (2012.01) |
| *H04N 21/482* | (2011.01) |
| *H04L 29/08* | (2006.01) |
| *H04M 1/725* | (2006.01) |

(52) U.S. Cl.
CPC .......... *H04L 65/60* (2013.01); *G06F 17/30749* (2013.01); *G06Q 30/0267* (2013.01); *G06Q 30/0601* (2013.01); *H04L 67/32* (2013.01); *H04N 21/2541* (2013.01); *H04N 21/4126* (2013.01); *H04N 21/482* (2013.01); *H04N 21/8113* (2013.01); *H04M 1/72558* (2013.01)

(58) Field of Classification Search
CPC .......... H04N 21/8113; H04N 21/2541; H04N 21/4126
USPC .............................................. 725/1, 2, 37, 62
See application file for complete search history.

(56) References Cited

U.S. PATENT DOCUMENTS

| | | |
|---|---|---|
| 5,790,423 A | 8/1998 | Lau et al. |
| 5,914,941 A | 6/1999 | Janky |

(Continued)

OTHER PUBLICATIONS

GB Patent Application No. GB 9925227.2, filed Oct. 25, 1999, entitled Data Storage, Retrieval and Access Systems.

*Primary Examiner* — Benjamin R Bruckart
*Assistant Examiner* — Jason Thomas
(74) *Attorney, Agent, or Firm* — Erise IP, P.A.

(57) ABSTRACT

A system and method employs an online site for making stored digital video recordings available for selection and download to a wireless communications device. Upon receipt of a selection for a digital video recording, the system and method causes the selected digital video recording to be wirelessly transmitted to the wireless communications device. The selected digital video recording is also made available to a personal computer associated with the user who made the selection. At least a title of the selected digital video recording is stored in a personal storage account of the user.

19 Claims, 4 Drawing Sheets

(56) References Cited

U.S. PATENT DOCUMENTS

| | | |
|---|---|---|
| 5,926,624 A | 7/1999 | Katz et al. |
| 6,158,005 A | 12/2000 | Bharathan et al. |
| 6,170,060 B1 | 1/2001 | Mott et al. |
| 6,253,237 B1 | 6/2001 | Story et al. |
| 6,314,577 B1 * | 11/2001 | Pocock ............................ 725/93 |
| 6,331,865 B1 * | 12/2001 | Sachs et al. ................... 715/776 |
| 6,407,750 B1 | 6/2002 | Gioscia et al. |
| 6,480,961 B2 | 11/2002 | Rajasekharan et al. |
| 6,560,651 B2 | 5/2003 | Katz et al. |
| 7,334,720 B2 | 2/2008 | Hulst et al. |
| 7,765,308 B2 | 7/2010 | Katz et al. |
| 7,895,288 B2 | 2/2011 | Story et al. |
| 7,942,317 B2 | 5/2011 | Racz et al. |
| 8,033,458 B2 | 10/2011 | Hulst et al. |
| 8,061,598 B2 | 11/2011 | Racz et al. |
| 8,118,221 B2 | 2/2012 | Racz et al. |
| 8,175,977 B2 | 5/2012 | Story, Jr. et al. |
| 8,336,772 B2 | 12/2012 | Racz et al. |
| 8,794,516 B2 | 8/2014 | Racz et al. |
| 2002/0046181 A1 | 4/2002 | Story, Jr. et al. |
| 2005/0028208 A1 * | 2/2005 | Ellis et al. ........................ 725/58 |
| 2006/0031257 A1 * | 2/2006 | Lipscomb et al. ......... 707/104.1 |

\* cited by examiner

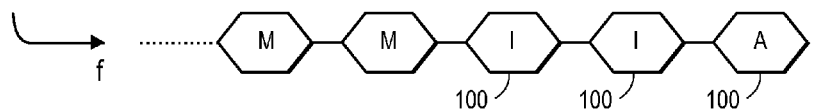
FIG. 7a
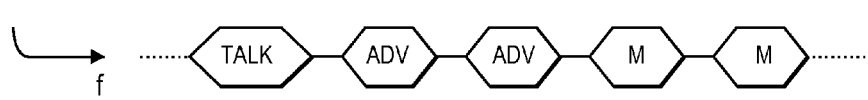
FIG. 7b
FIG. 7c
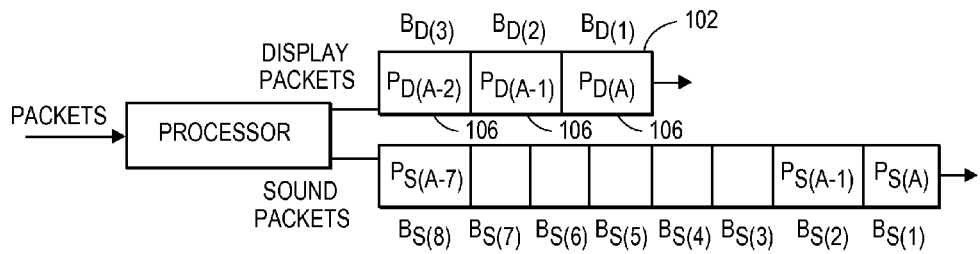
FIG. 8
ARTIST:
   JEWEL
ALBUM:
   THIS IS IT
RECORDED:
   XX-XX-XX
         SOURCE
FIG. 9a
ORDER A LARGE
PIZZA FROM
"PIZZA HUT"
NOW
STATION CDNOW ORDER
FIG. 9b

DIGITAL MEDIA DISTRIBUTION SYSTEM AND METHOD

RELATED APPLICATIONS

This continuation application claims priority benefit, with regard to all common subject matter, of earlier-filed U.S. patent application Ser. No. 13/679,295, filed Nov. 16, 2012, and entitled Digital Media Distribution System and Method ("the '295 application"). The '295 application is a continuation application and claims priority benefit, with regard to all common subject matter, of earlier-filed U.S. patent application Ser. No. 11/437,121, filed May 18, 2006, now U.S. Pat. No. 8,385,912, and entitled Digital Media Distribution System ("the '912 patent"). The '912 patent is a continuation application and claims priority benefit, with regard to all common subject matter, of earlier-filed U.S. patent application Ser. No. 09/721,120, filed Nov. 22, 2000, now U.S. Pat. No. 7,065,342, and entitled System, Method and Device for Playing Recorded Music on a Wireless Communications Device ("the '342 patent"), which claims priority benefit of U.S. Provisional Application No. 60/167,179, filed Nov. 23, 1999, and entitled System, Method and Device for Playing Recorded Music on a Wireless Communications Device. The above-referenced patent applications and patents are hereby incorporated by reference in their entirety.

BACKGROUND

1. Field

The present invention is generally directed to a system and method for wirelessly transmitting encoded music, via a wireless communications link, to a portable or mobile communications device which includes a player for playing the music or audio.

SUMMARY

In one embodiment, the present invention is a system for transmitting encoded music from a remote, central facility to a wireless communications device, such as a cellular telephone or personal digital assistant. In particular, a user of the cellular telephone (for example) may use the telephone to establish a wireless communications link with the remote, central facility, and then wirelessly download one or more selected music recordings for storage in a memory of the cellular telephone. In particular, the selected music recording(s) is/are transmitted via a wireless data communications link to the cellular telephone. Preferably, the music recordings are encoded and transmitted in packets, and may particularly be encoded by a compression algorithm into an encoded (such as MP3 or other) format.

Using an input of the cellular telephone, a user may select one or more recordings for transmission to the cellular telephone. The selected music recordings, upon receipt by the cellular telephone, are stored in a memory. In one embodiment, the memory is an internal memory. Alternatively, the memory may be a separate cartridge or memory stick (such as a flash memory cartridge) for movable installation in a bay on the telephone. A player within the cellular telephone may then be initiated to play the music recordings, for output on a speaker. In particular, the speaker may include earphones or earplugs connected to a port on the cellular telephone. Alternatively, the player may output the music through an internal speaker of the cellular telephone.

In an alternate embodiment, the wireless communications device is utilized in combination with a vehicle, and a player, a memory for storing the music, and at least one speaker, are located within the vehicle, such that selected recordings may be retrieved from the remote central facility, and played in the vehicle. In this embodiment, the memory may include one or more burnable CDs, and will typically have far more memory storage capacity than the memory of the cellular telephone, which is utilized in the previous embodiment.

In either embodiment, the wireless communications device preferably includes a buffer for streaming data indicative of the music. Additionally, the wireless communications device is preferably a cellular communications device and, in particular, is a cellular voice communications device, such as a cellular telephone.

In accordance with yet an additional aspect of the present invention, the wireless communications device of the present invention (whether it be handheld or installed within a vehicle) retrieves recorded music from a personal storage unit of the user. For example, a user may have a CD tower, flash memory unit, etc. in his or her home or apartment, or may have a personal storage account at a central facility. A plurality of recordings may be stored in the personal storage unit. The personal storage unit is accessible via a wireless communications link from the wireless communications device, to thereby enable the retrieval of selected music from the user's own storage facility. Additionally, such a system permits the user to easily mix recordings from a number of different recordings from his or her own storage unit.

Thus, the system of this embodiment of the present invention utilizes the central facility having music recordings stored therein, a personal storage facility located remotely from the central facility, such as in the residence of a user, and the wireless communications device. In this embodiment, when a user selects one or more recordings from the central facility, rather than the recordings being transmitted to the wireless communications unit directly via a wireless communications link, they are rather transmitted to the personal storage unit of the user. Once stored in the personal storage unit, the user can then access his or her personal storage facility via a wireless communications link for retrieving, via the wireless communications link, one or more selected recordings. In accordance with this embodiment of the present invention, the encoded music transmitted to the personal storage unit may be stored in a flash memory or, alternatively, may be stored on burnable CDs or any suitable storage medium. In this regard, the encoded music transmitted to the personal storage unit of the user may be decoded, for storage in a decoded manner such that it may be played by more traditional music players or, alternatively, may be stored directly in its encoded format. When stored in a decoded format, music recording is again encoded at the personal storage unit upon retrieval. The personal storage unit may be located at the central location or at a remote site or may comprise a personal computer or an entertainment center, including such components as a display screen (e.g., TV or information TV), stereo, speakers, etc, or as stated, an account at a storage location. It should be understood that wirelessly retrieving a recording from a personal storage unit that is located in physical proximity to the user (e.g., an entertainment center, TV, personal computer, etc.) may be accomplished either by connection with a wide area communications network, or alternatively, by a local area wireless connection or protocol, such as Bluetooth and other such technologies.

It should be understood that the transmittal of the recording to the personal storage account may embody transmitting only a portion of the recording, such as the title and memory (e.g., address) storage location of the recording, such that the personal storage account serves as a directory or index for retrieval of acquired or accumulated recordings. In this regard, the recordings may be stored in a contained database, or may be located at multiple storage sites dispersed within a network. In either case, each recording will have a programmed address to which the personal storage account will point for a corresponding recording. Upon access to the personal storage account by the account holder (via a communications device), and after entry of any required passwords, the user may select one or more recordings for streaming or download, whereupon the recording(s) will be retrieved. Temporary copying/cloning techniques may be used to insure at least substantially simultaneous accessibility to the recording by a large number of users.

In accordance with an additional aspect of the present invention, information pertaining to the music recording, such as the artist, title of the recording, an album from which the recording came, the date of the recording, etc. is also transmitted with the recorded music, such that the informational data is displayed on a display of, or associated with, the wireless communications device when the particular recording is being played. Additionally, it is an aspect of the present invention that an identifier, such as a server address, associated with the remote central facility is encoded along with the transmitted data, such that a selected input on (or associated with) the wireless communications device may be pressed for automatically reconnecting with the central facility or personal storage unit.

In preferred embodiments of the present invention, the wireless communications link established between the wireless communications device and the central facility is a cellular communications link and, more particularly, is an Internet link. In other words, the encoded music and/or informational data is preferably transmitted via a packet switch network, and particularly is preferably transmitted at transmission speeds greater than 50 KHz, such as by a next- or third-generation wireless communications network.

In accordance with yet an additional object of the present invention, the music recordings transmitted to the wireless communications device from the central storage facility, or from the personal storage unit of the user, may be transmitted in a real, or substantially real, time basis. In other words, rather than downloading one or more recordings to a memory within the wireless communications device, encoded music may be streamed directly from its source, for input into a buffer within the communications device, and for play at the communications device, without being otherwise stored in the device. In other words, the music is played as it is streamed from the central storage facility or personal storage unit of the user.

In accordance with yet an additional aspect of the present invention, the wireless communications device receives a sound stream from a source, where the sound stream is in a real time broadcast. For example, a radio broadcast may be encoded and transmitted via a wireless communications link to the wireless communications device. The broadcast may, for example, be a broadcast of music or, preferably, is a traditional radio-type broadcast having transmission of recorded music, advertisements, and voice from one or more disc jockeys. Accordingly, the source (e.g., radio station) may have a plurality of inputs for inputting stored music, stored advertisements, or real time voice from a disc jockey. The input information is encoded (if not already encoded) and transmitted to the wireless communications device via an established communications link. In particular, the data stream is a stream of data packets which are streamed through a buffer of the wireless communications device for decoding and play.

In accordance with the particular aspect of this embodiment of the invention, informational data associated with music or advertising being transmitted is displayed on the display. More particularly, information transmitted to the wireless communications device may be associated with a particular input on the device, such that a communications link corresponding to the displayed information may be made. For example, when a music recording is being played at the wireless communications device, data indicative of that recording may be displayed on the display, and, additionally, a selected key on the wireless communications device may be pressed to transmit a signal to the source of the stream that the user of wireless communications device wishes to purchase the music recording. Alternatively, the signal may be transmitted to a remote music storage facility for effecting a purchase of the recording or its associated album. In this regard, the purchase can be conducted in an electronic input mode or, alternatively, a link may be established for transmitting voice communications to and from the source or music storage facility (as the case may be) at which the sound recording or its associated album is to be purchased. In making the purchase, the user may select whether to have the sound recording or its associated album downloaded to the wireless communications device (if memory space permits), or to a remote personal storage unit or account of the user, or to have the sound recording or album stored on a storage medium and transmitted to an address of the user by mail or courier. In accordance with an additional aspect of the invention, payment for the sound recording or album may be made at the time or, alternatively, a monetary amount corresponding to the purchase may be billed to a periodic invoice associated with the wireless communications device (such as a telephone bill).

As another example of utilization of the present invention, information corresponding to an advertiser may be displayed on a display screen during an advertisement, and an identifier (such as an electronic address or telephone number) may be associated with a particular key on the communications device, such that activation of the key establishes a voice and/or data communications link with the advertiser, such as for the purpose of making a purchase of goods or services advertised. Additionally, and preferably, an identifier (such as an address or telephone number) associated with the radio station or streaming source is allocated to a particular key, such that the user may contact the source and transmit information thereto, or have a voice conversation with the source. This is particular advantageous for responding to call-in shows, trivia contests, games, etc. sponsored by the source/radio station.

As another example of the transmission of sound and information, the broadcast from the source may be a real-time broadcast of an athletic event, broadcast by one or more announcers. The voice signals of the announcer is encoded and transmitted to the wireless communications device 12. Additionally, information corresponding to the athletic event being broadcast may be transmitted and displayed on the display. For example, the contestants, the scorer of the contest, the time remaining, and other circumstances relating to the game may be transmitted and stored. Preferably, this informational data is periodically transmitted, so as to update the display.

BRIEF DESCRIPTION OF THE DRAWINGS

The objects and features of the invention noted above are explained in more detail with reference to the drawings, in which like reference numerals denote like elements, and in which:

FIGS. 7a-7c are exemplary illustrations of how data is transmitted in packets;

FIG. 8 is an illustration of streaming data through one or more buses in accordance with the invention;

FIGS. 9a-9d illustrate screen displays in accordance with the present invention.

DETAILED DESCRIPTION

Figure 1:
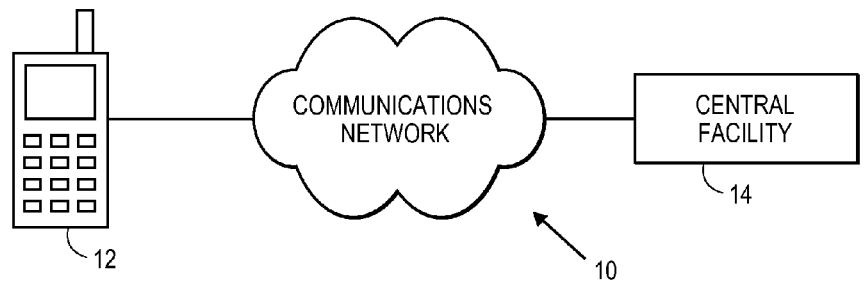
FIG. 1 is an illustration of a system of a first embodiment the present invention.

With reference initially to FIG. 1, a system of the present invention for playing encoded music on a wireless communications device is denoted generally by reference numeral 10. In particular, system 10 has a wireless communications device 12, such as a cellular telephone. Preferably, wireless communications device 12 is a digital, cellular communications device, and is portable and handheld. In this regard, while one preferred communications device is a telephone, it should be understood that the wireless communications device may be types of devices, such as a palm or handheld computing device having wireless communications capabilities.

A communications link may be established between wireless communications device 12 and a remote storage facility, denoted by reference numeral 14. The remote storage facility may, for example, be at an address on the world wide web, and includes a data base having a plurality of music recordings therein. Preferably, the music recordings are categorized by a plurality of selectable fields, such as "title", "artist", "album or CD type", "recording label", etc. Additionally, the music recordings are preferably encoded in an encoded format, such as MP3 (Mpeg-1 Audio layer 3). It will be understood that the music recordings may be encoded in other formats or, alternatively, may not be encoded at all. In this latter instance, remote storage facility 14 also includes an encoder (not shown in FIG. 1) for encoding a recording when it is selected to enable it to be efficiently transmitted via a communications network 18.

As will become apparent from the detailed discussion below, the wireless communications device 12 may be utilized to establish a communications link with the remote storage facility 14. Then, using a keypad and input on the wireless communications device, or by voice commands, one or more selected music recordings may be retrieved from the storage facility 14, for transmission, via wireless communications link, to the device 12. As will become apparent from the detailed discussion below, the retrieved music recording or recordings may be stored in a memory within the communications device 12, on a memory cartridge or stick insertable into the device 12 or, alternatively, may simply be strung through a buffer of the device 12 for playback, and no stored at the device 12.

Figure 2:
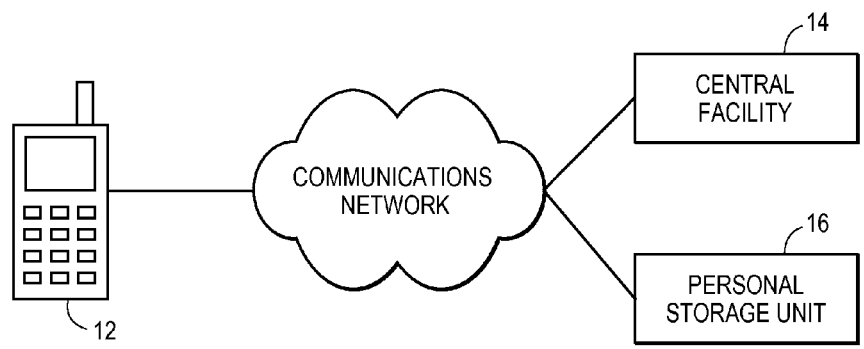
FIG. 2 is an illustration of a system of a second embodiment of the present invention.

With additional reference now to FIG. 2, an alternate embodiment of the present invention is illustrated and described.

In the embodiment of the present invention illustrated in FIG. 2, a wireless communications device 12 communicates with a central facility 14 for retrieval of one or more stored music recordings. Also in this embodiment, in addition to the wireless communications device 12, and central facility 14, the system 10 of the present invention further includes a personal storage unit 16. However, in this embodiment, the retrieved recordings (after being encoded if necessary) are not transmitted directly to the wireless communications device 12, but are transmitted via a personal storage unit or account 16 of the user. It should be understood that the communications link between the central facility 14 and personal storage unit 16 may be either hard wired or wireless. In this regard, the personal storage unit 16 may be an account located at the facility 14, or remotely therefrom. The storage unit for storing music recording may, for example, be in a home or residence of the user of wireless communications device 12. As will be discussed in greater detail below, in this embodiment, one or more selected music recordings are transmitted to the selected, personal storage unit 16 of the user. Subsequently, the user of wireless communications device 12 establishes a wireless communications link with the personal storage unit 16 for retrieving selected music stored therein.

In accordance with yet an additional aspect of the invention, a music recording desired to be played on wireless communications device 12 need not be fully stored within the device 12. In this regard, for example, a music recording stored in central facility 14 or personal storage unit 16 may be streamed to the wireless device 12 via an established communications link. In such an instance, data packets are streamed through a buffer for play by a player each of which are in a memory 26 (see FIG. 4), such that, as one data packet is played within the buffer, and then exits the buffer, an additional data packet is streamed into the buffer.

Figure 3:
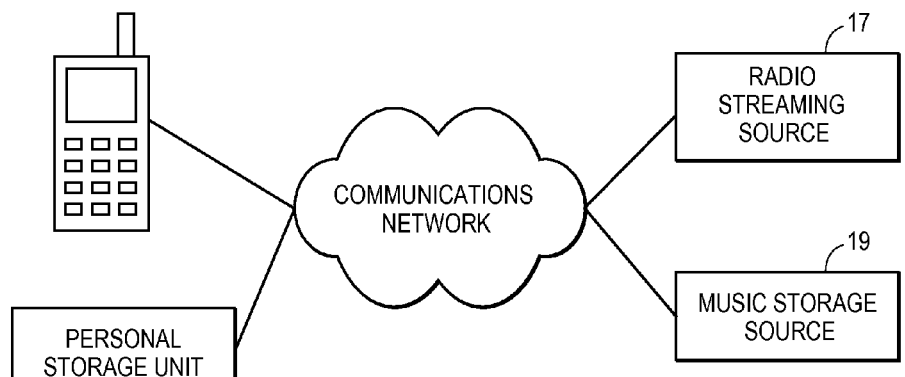
FIG. 3 is an illustration of a system of a third embodiment of the present invention.

With reference to FIG. 3, and in accordance with an alternate embodiment of the invention, a source of streaming audio 17, such as radio station broadcasting signals, may transmit an audio stream to device 12. Wireless communications device 12 may be utilized to establish a link with the radio station source 17, for receiving an encoded stream of data indicative of the transmission of the radio station. In such an embodiment, the encoded stream of data packets are passed through a buffer for play by a player (see FIG. 4), thereby making wireless communications device 12 a digital radio for receiving streams of encoded audio data.

Additionally, and in accordance with a particular aspect of the present invention, in addition to the audio data transmitted to the communications device 12, informational data is also sent for display on display 24. As will be appreciated, in view of the foregoing discussion, that informational data may be stored in packets and, preferably, is stored in packets that are transmitted at the beginning of a particular recording, or packets that are periodically spaced within a set of other packets. Thus, for example, when a particular music recording is played by the radio station, and output at the wireless communications device 12, data indicative of the music recording is displayed on display 24. In accordance with a particular aspect of the present invention, at least a portion of that informational data is associated with a selected input on communications device 12, such that upon activation of the input, the user of communications device 12 may order (for purchase) an authorized copy of the recording, or the album upon which the recording is placed. In this regard, upon activation of the key associated with the informational data, in one embodiment, while pressing the key associated with the selected information, data indicating that the user desires to make a purchase is transmitted to the station/source 17 or other facility. It should also be understood that the informational data may be retained at the server which is sourcing the recording, such that activation of a selected input causes a signal to be transmitted to the server, the receipt of which is matched with the information pertaining to the recording being transmitted. In any case, the purchase can be effected via the station/source 17 or other site, such as indicated by music storage source 19, either through appropriate inputs on the communications device 12, or by establishment of a voice communications link with the central facility 14.

In addition to the user having a choice of whether to buy the single being played, or the entire album on which the single is located, the user also has the opportunity to select the manner in which the purchased recording or album will be distributed to the user. For example, the purchased recording or album may be downloaded to the wireless communications device 12 (if memory space suffices) or, alternatively, may be downloaded to the user's personal storage unit 16. Alternatively, the user can select to have a storage medium upon which the music is recorded (such as a CD, for example) mailed to a selected address of the user.

Accordingly, the present invention provides a very unique feature for the distribution and purchasing of music recordings, by allowing an individual to make a purchase of a recording and/or its associated album upon hearing the recording.

In accordance with yet an additional aspect of the present invention, as the radio station transmits audio advertising content, informational data indicative of the advertiser is displayed on display screen 24. In particular, data indicative of a URL or telephone number is preferably associated with a particular key on the communications device 12, such that by pressing the associated key, a communications link (either data or voice) is established with the source of the advertising. Thus, for example, during an ad for "Pizza Hut", a particular button may be pressed to establish a communications link with a telephone number or address associated with Pizza Hut, for the purpose of ordering a pizza. In this embodiment, the communications device 12 preferably has an additional buffer for buffering the informational display data. Moreover, in a preferred embodiment, data indicative of a plurality of most recent advertisements is preferably stored in the buffer, and associated with a corresponding number of inputs or a menu driven system, such that, sources associated with the most recent advertisements may be readily contacted.

It is contemplated within the scope of the present invention that a server for accessing content transmitted by the radio station may be a satellite server as well. In other words, the communications link may or may not include a satellite communications link.

Figure 4:
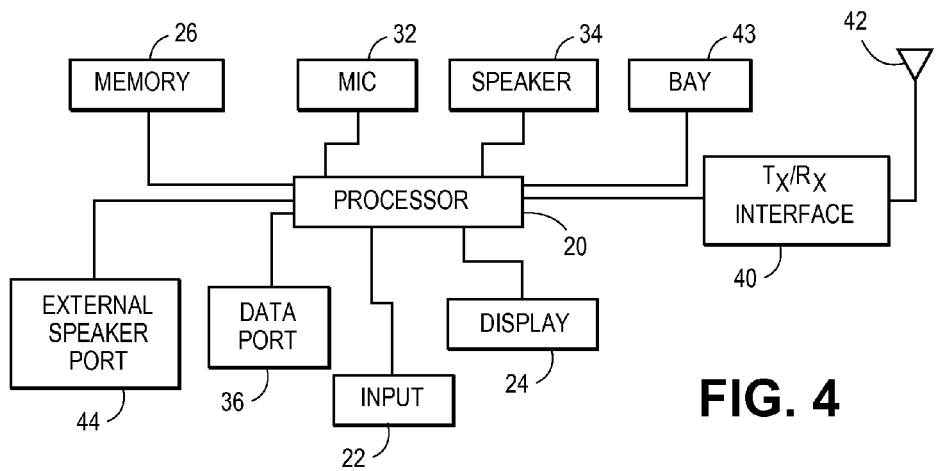
FIG. 4 is a block diagram of a conventional wireless communications device utilized in accordance with the principles of the present invention.

With additional reference to FIG. 4, wireless communications device 12 has a processor 20. Connected to processor 20 are an input (such as a keypad 22), a display 24, a memory 26, a microphone 32, a speaker 34, and a port 36. Additionally, a DTMF encoder/decoder (or just an encoder, if desired) 38, and a transceiver 40, and antenna 42 are connected as shown. Additionally, wireless communications device may have a bay 43 for receiving a memory cartridge or stick, such as a flash memory unit. Furthermore, device 12 has an external speaker port (e.g., for ear plugs or headphones) 44. The construction of conventional wireless communications devices, such as cellular phones, is well known. However, in accordance with the present invention, a buffer and a player for playing encoded music through an internal speaker, or via headphones or earplugs connected to a speaker port, such as port 44 are provided. In accordance with the invention, the player is a set of encoded instructions, stored in a memory 26, for decoding and playing recorded, encoded music as it is streamed through a buffer. Additionally, device 12 may have a bag or port for receiving a memory cartridge or stick, such that recordings may be stored on a removable memory device, and such that recordings played by the player are retrieved from the cartridge or stick.

In this regard, the wireless communications device 12 may be provided from a manufacturer with a player already installed in the device 12. Alternatively, the player may be loaded into the communications device 12 by an end user of the device. In this regard, and in accordance with an aspect of the invention, a user of communications device 12 may establish a communications link with a central facility, such as storage facility 14, and utilizing inputs on the device, such as a keypad, or a microphone (where the inputs are by voice), make appropriate selections for retrieving an encoded player for storage in the communications device 12. In this regard, when such a selection is made, the set of instructions comprising the player are themselves preferably encoded (if they are not already encoded), and transmitted via the wireless communications link to communications device 12, for storage in memory. Accordingly, it is a particular aspect of the invention to wirelessly load a set of instructions, and particularly a music player for decoding encoded, recorded music, into a wireless communications device, such as a cellular telephone or communications equipped palm computing device, such as a portable digital assistant. As part of the invention, data indicative of the type of operating system installed within communications device 10, and/or memory storage limitations, may be transmitted to central facility 14 for use in selecting a player from a plurality of players.

In accordance with another aspect of the invention, any charges associated with downloading a player (which would preferably be free) and/or loading recordings may be charged directly to a periodic invoice associated with the wireless communications device, and particularly associated with other services (such as telephone services) associated with the wireless communications device 12. Alternatively, and in accordance with an aspect of the invention, subscriptions may be established such that a user of communications device 12 may have unlimited or a selected amount of access to the music stored at remote facility 14 so long as a periodic subscription fee is paid. For example, for a selected periodic subscription fee, a selected number of recordings (or albums) may be retrieved. Beyond the selected number within the period, additional fees would be incurred. In this regard, and in accordance with the particular aspect of the invention, the subscription fee is invoiced together with other charges associated with services for usage of the wireless communications device 12. Alternatively, purchases may be accounted for via electronic transmission of an account number of the user, or in more traditional manners.

Figure 5:
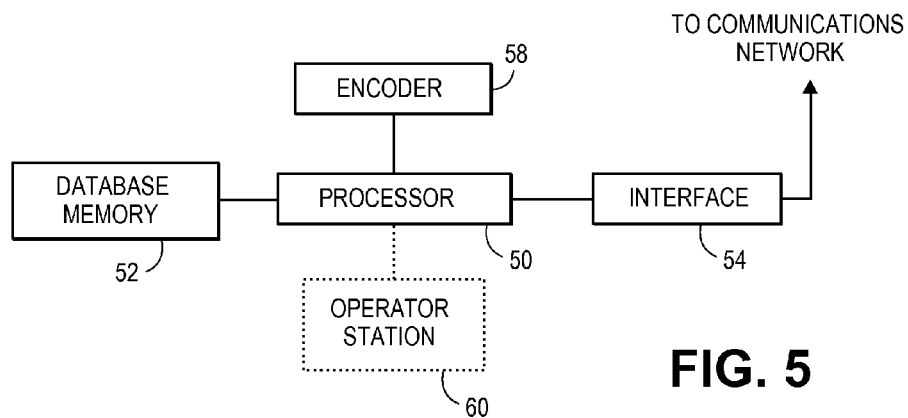
FIG. 5 is a block diagram of a central facility of the present invention.

With reference initially to FIG. 5, a block diagram of the central facility 14 is illustrated and described.

In particular, a central facility 14 has a processor 50. Connected to the processor 50 are a data base memory 52 and a interface 54 (such as a transceiver or modem) for transmitting and receiving communications signals. In addition, the central facility 14 may also have an encoder 58 and an operator station 60. The encoder 58 is a set of processing instructions stored in a memory for encoding music recordings stored within data base memory 52. In particular, when wireless communications device 12 accesses the central facility 14 via the communications network for purpose of retrieving one or more selected recordings, the encoder 58 may be utilized to encode the music, according to any preferred encryption and/or compression algorithm (such as mp3, liquid audio, etc.), for transmission of the encoded recording(s) to the wireless communications device 12. Alternatively, the music recording stored within data base memory 52 may be stored in an encoded/compressed manner, such that the encoder 58 is not necessary. While the operator station 60 is not necessary, it may be provided for allowing the user of wireless communications device 12 to have a voice conversation with an operator employed at the operator station 60. As will be appreciated, in the absence of an operator, processor 50 invokes application software for providing a menu driven system to wireless communications device 12, such that the wireless communications device 12 can be utilized to select recording via a menu or listing of recordings. Alternatively, the central facility 14 may be equipped with a voice response system, such that an individual at wireless communications device 12 makes necessary entries/selections via voice commands.

Figure 6:
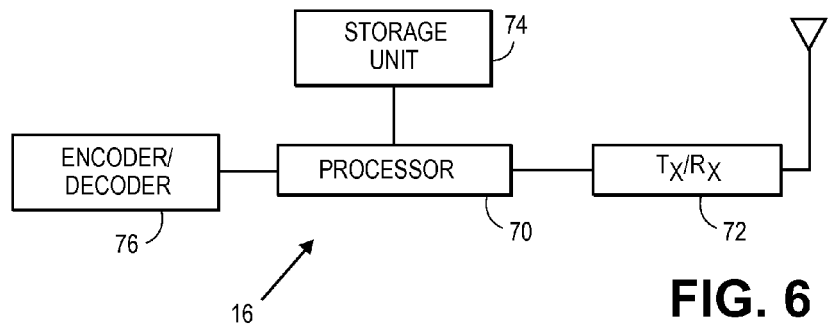
FIG. 6 is a block diagram of a personal music storage unit of the present invention.

With additional reference to FIG. 6, a personal storage unit 16 is illustrated and described.

Personal storage unit 16 has a processor 70. Connected to the processor 70 is interface 72 (such as a transceiver or modem). The personal storage unit 16 also includes a storage unit 74, such as a CD ROM tower, flash memory, or other storage medium, etc., for storing music recordings. Additionally, the personal storage unit 16 may include a decoder/encoder 76 which is a series of software instructions for decoding and encoding music recordings. In this regard, and in accordance with the embodiment (as set forth in FIG. 2) in which the wireless communications device is utilized to retrieve selected recordings from central facility 14 for storage in the personal storage unit 16, the encoded music received from central facility 14 at the personal storage unit 16 may first be decoded prior to storage in the storage unit 16. In such an instance, upon retrieval of a selected recording from the personal storage unit 16 for play at the wireless communications device 12, the encoder first encodes a retrieved recording for wireless transmission to the wireless communications device 12. Alternatively, it should be understood and appreciated that the encoded music received by the personal storage unit 16 may be stored in an encoded fashion, such that the decoder/encoder is unnecessary.

In accordance with one aspect of the invention, personal storage unit 16 may also be a memory storage location at the central facility 14, or other remote site. In this way, a user of device 12 may have a personal account for storing recordings, such that the account (e.g., personal storage unit 16) is accessible via device 12 and other devices (such as a personal computer). As described above, a personal storage account may store only selected information pertaining to a recording, such as a title and an address or memory location of the recording, such that a recording may be retrieved through a corresponding account listing by accessing and/or retrieving the remote file containing the selected recording. It is also specifically contemplated that such a personal storage account system may employ a file sharing program such that the listings in the account do not include corresponding addresses, but that the file sharing program merely searches for an approved (based upon defined standards) copy of the recording, and then retrieves the recording once found. Alternatively, the personal storage account may include a last known address of a selected recording and, when that address no longer contains the recording, a search for an approved version of the recording is made and, when found, the last known address is updated. As will be appreciated, use of a common database or a network-oriented file sharing approach, accessible via a personal storage account, conserves storage space since it does not require a single copy of the recording for each user that acquires the recording.

With reference now to FIG. 7, a representative example of how data packets are transmitted in accordance with a protocol of the present invention is illustrated. In particular, with reference to FIG. 7a, data is transmitted in a plurality of data packets 100. In particular, for example, the first set of data packets, including one or more packets 100, may include information pertaining to an identifier or address associated with a source of the streamed data. In the example of FIG. 7a, the packet is marked with a "A", and is an initially transmitted packet. Additional packets may contain information pertaining to a music recording being transmitted, and as illustrated in FIG. 7a, any such packets are designated by a "I". The remainder of the packets include data indicative of the music recording being transmitted, and are labeled "M". In the example of FIG. 7a, the address identifier and the information pertaining to the music recording are transmitted first, and thus serve as a header. It will be understood and appreciated that the address and/or information data may be transmitted to other locations within the data stream.

In the example of FIG. 7b, a real time data stream is illustrated. As illustrated, the data stream includes music, followed by data indicative of an advertisement (and labeled ADV), followed by data packets indicative of talk. Such a data stream would be representative of the real time radio broadcast, including music, advertising, and talk from a disc jockey or host.

In the example of FIG. 7c, data indicative of a voice broadcast, labeled "talk" is encoded in packets, and other "data", as labeled, is interspersed within the talk data packets in accordance with protocol. This illustration, for example, the broadcast may be a real time broadcast of an athletic event, wherein the data packets include data indicative of the circumstances of the athletic event, such as the score of the game, or other circumstances. It should be understood that any desired protocol may be employed. Additionally, the data is preferably compressed and encrypted such that subsequent decoding involves both decompression and de-encryption.

With reference to FIG. 8, one preferred example of how the data packets are processed is illustrated. For example, data packets received by wireless communications device 12 are processed by processor 20, and passed through at least one buffer. In the simplest embodiment of the present invention, only a single buffer is needed, such that all data packets are transmitted through the same buffer. However, in a preferred embodiment, multiple buffers or stacked memory are/is utilized, for the purpose of separating data packets corresponding to different features. For example, as illustrated in FIG. 8, the processor 20 (or a data parser) transmits those packets containing data for displaying on a display of the wireless communications device to buffer 102, while data indicative of sound (e.g., audio such as talk, music, etc.) are streamed through a sound buffer 104. As illustrated, each of the buffers 102, 104 have corresponding buffer locations, indicated as $B_{dn}$, for streaming data packets such as $P_{dn}$ (for display data), or $P_{sn}$ (for sound data). Additionally, as illustrated in FIG. 8, each of the buffer locations of display buffer 102 may have a correspondingly associated input, designated by inputs 106 such that information displayed on a display may be associated with a particular input on the wireless communications device. In this regard, for example, when information indicative of an identifier of a source of the music or of an advertiser is displayed on the display, the corresponding input may be activated to establish a communications link with that source or advertiser. Alternatively, as will be appreciated, packets containing address or identification information, such as that packet labeled "A" in FIG. 7a, may be routed through yet an additional input buffer, wherein buffer storage locations within which the input buffer corresponding inputs on the wireless communications device 12.

With reference to FIGS. 9a-9d, display screens of wireless communications device 12, in use, are illustrated. For example, in the illustration of FIG. 9a, data indicative of an artist, album, or recording data associated with a particular music recording being played by wireless communications device 12 is illustrated. Additionally, data indicative of a source of the music recording is illustrated and, preferably, positioned on the display in association with the corresponding keypad input, such that by pressing the keypad input 106 a communications link with the source will be initiated. It will be understood and appreciated that, in view of the foregoing discussion regarding data packets and buffer storage locations, that data indicative of an identifier of the source may be stored in a corresponding buffer location associated with the keypad input.

FIG. 9b is illustrative of a situation when an advertisement in a streaming audio signal is being output by the player, with corresponding data displayed on the display screen. In the example illustrated, the user is invited to order a large pizza from Pizza Hut. In accordance with the invention, the user may place an order during the advertisement by pressing a button corresponding with "order" display feature on the display. Again, this is accomplished through the positioning of data and corresponding memory location, where the data includes an identifier (such as an address or telephone number) for establishing a communications link with the advertiser. As is also illustrated, in the scenario in which a user of communications device 12 is receiving a real time streaming audio broadcast, data indicative of the real time streaming broadcast includes data indicative of the station or streaming source from which the broadcast is being received is transmitted, and stored in a particular memory or buffer storage location, and associated with a keypad input, such that the station may be contacted with a single entry. This is particularly useful for call-in shows, contests, making requests to the station, etc.

Figure 9C:

With additional reference to FIG. 9c, an example of real time streaming broadcast, in which music is being output along with corresponding data on the display, is illustrated. In accordance with an aspect of the present invention, data indicative of a site at which the particular music recording is being played (and/or it associated album or video) can be ordered is transmitted and associated with a particular input, as evidenced by "order" on the display at which location is associated with a particular keypad input on the wireless communications device. Accordingly, while listening to the music recording, an individual may activate the order key and be connected with a source for ordering that particular music recording. For example, the identifier or address associated with the "order" location may be the source of the streaming music, or alternatively, may be a remote music storage source, such as indicated by reference numeral 19 in FIG. 3. Additionally, upon activation of the order key, either a data, a voice, or a combined voice/data link may be established with the source at which the music recording is to be purchased, and the purchase may be conducted in a purely electronic fashion, or by speaking with an operator. Preferably, such a link terminates the link with the streaming source, although terminating the initial link may not be necessary if there is sufficient bi-directional bandwidth available. Additionally, a selection of how the purchase is to be made could also be entered using wireless communications device 12. For example, purchase may be made such that a complete copy of the sound recording (or its associated album) is downloaded to the memory 26 within wireless communications device 12. Alternatively, the user can specify, either by input, or through a previously established account with the source at which the recording is being purchased, to have the music recording downloaded to a remote, personal storage unit, such as the personal storage unit 16 indicated in FIGS. 2 and 3. Alternatively, the user may simply select to have the music recording located on a transferable medium, such as a CD or DVD, and courriered or mailed to a selected address of the user.

Additionally, as illustrated in FIGS. 9b and 9c, the contact information is preferably buffered or QUED in such a way that at least one additional, previous address or identifier is temporarily stored. For example, where the data first includes an advertisement from Pizza Hut (as in FIG. 9b), and then streams a recording by Jewel (as indicated in FIG. 9c), the data indicative of Pizza Hut is moved over one location on the display and associated with a different key, such that even after the Pizza Hut advertisement has concluded, a communications link with a Pizza Hut central source may still be made. It will be understood and appreciated that the QUE or buffer for retaining prior items associated with particular sets of data streams may also be retained in memory, although not displayed on the display, such that through utilization of a scroll feature previous items may be recalled.

Figure 9D:
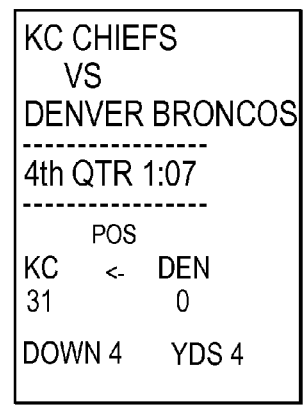

FIG. 9d illustrates display of athletic contests, such as a football game. In accordance with the invention, and as described, as the user is listening to a broadcast of the athletic contest, data indicative of the contest may be transmitted, according to a protocol for display on the display. In the example of FIG. 9b, the data includes the contestants in the contest, the amount of time remaining in the contest, and in the instance of a football game, a possession arrow to indicate which team has possession of the football, a score, and down, yards to go, and location of the line of scrimmage. It will be appreciated that other circumstances associated with athletic events, depending upon the nature and type of the event, may be displayed. Additionally, the information is periodically updated as additional data packets including data indicative of the real time circumstances of the game are transmitted.

In use, a user of communications device 12 may establish a communications link via the communications network with the remote storage facility 14. In a preferred embodiment, the facility 14 has a uniform resource locator (URL) on a global communications network (such as the world-wide web), and device 12 accesses the facility 14 via a server in the communications network. Alternatively, device 12 may be utilized to dial directly a telephone number associated with the storage facility 14. Using keypad input 22, or microphone 32, when storage facility 14 includes voice recognition equipment, the user may select one or more music recordings for downloading to the wireless communications device. If the selected recordings are already encoded, they are transmitted to the wireless communications device 12 via the communications network, and stored in memory 32. Alternatively, if the selected recordings are not already encoded by encoder 58, they are first encoded at the storage facility and then transmitted via the communications network to the communications device 12.

As will by now be appreciated in view of the foregoing, the communications device 12 may also be used for retrieving one or more music recordings from a remote storage facility 14 for storage in a personal storage unit 16 of the user. As described, the personal storage unit 16 may be a memory storage location at an address on the global communications network and, indeed, may be located at the remote storage facility 14. In such an instance, when a communications link with a remote storage facility 14 is established with wireless communications device 12, the user can select whether he or she wishes to select new recordings, or enter his or her personal storage unit account for retrieval of recordings that have already been purchased.

In accordance with a preferred aspect of the present invention, the music recordings are encoded in data packets for transmission via a packet switched network. In particular, it is preferred that the wireless communications network be a next or third generation network, such that data transmissions are at sufficiently high speeds, and preferably greater than 50 KHz.

Once an encoded music recording is stored in memory 26, or on a memory cartridge, of the wireless communications device 12, the input 22 may be utilized to control the player to play the recording. In this regard, when a music recording is retrieved from memory for play, the player decodes the encoded data packet according to conventional steaming techniques in the buffer. The player outputs the music via speaker 34 or, in the event earplugs or headphones are connected to port 44 of communications device 12, then the music is outputted via the headphones or earplugs.

In accordance with an aspect of the invention, information relating to a music recording is preferably transmitted along with music recording data for storage in memory 26. For example, data indicative of the artist, the title of the recording, the album or CD from which the recording came, the recording label, the date of the recording, or any other desired information may be stored along with the recording at storage facility 14, and transmitted for storage in memory 26. Preferably, the informational data is stored as a header (e.g., in one or more integrally transmitted data packets) (See FIG. 1), such that processor 20 outputs the information to display 24. Alternatively, informational packets may be disseminated between packets containing music data. Additionally, it is an aspect of the present invention that each music recording stored at facility 14 has associated therewith data indicative of an electronic address of the facility 14, which address data is also transmitted to the communications device 12 upon retrieval of a music recording. Communications device 12 is programmed such that, upon retrieval and playback of the recording, the data indicative of the address of the storage facility 14 is associated with a particular key or input on communications device 12 and may remain stored in a memory location associated with that key even after playback is completed (or until replaced with other data). Thus, the user of communications device 12, upon opening the "player application", will be able to immediately establish a communications link with storage facility 14 by pressing the program key. In this regard, informational data indicative of the address, or indicating to the user that a particular key may be pressed to establish a quick communications link with the storage facility 14, is preferably displayed on the display.

Alternatively, the present invention may be utilized to stream audio which is music or broadcast, in real time, from a streaming source. In such an instance, the streamed data is not stored in an internal memory of wireless communications device 12 or in a memory cartridge, but simply streamed through the buffer and played. As described, information indicative of that which is being streamed may be simultaneously output on a display of the communications device Particularly, contact information (e.g., a telephone number or electronic address) is preferably associated with an input such that an additional communications link may be established with a source or entity associated with the information. In the preferred embodiment described, for example, a user may establish a link with source of an advertisement for purpose of making a purchase. It should be understood and appreciated that the actual communications link made may be made through the streaming source (such as a radio station), or may be made through another remote site, such as a transaction clearing house. Additionally, it is contemplated that location information, such as may be obtained via an incorporated global positioning system unit, or by a network location determining feature, may be transmitted along with any signal such that the communications link may be routed, if desired, to a particular location. For example, in the instance of "Pizza Hut", which has a plurality of locations, the call may be routed to a nearest most Pizza Hut. Preferably, however, the call is initiated to a central location of Pizza Hut, or to a web site or answering service engaged by Pizza Hut and other entities for the purpose of taking orders. Additionally, it should be understood and appreciated that while the preferred input is a key on the telephone, or communications device 12 being employed, the input may be any other type of input, such as a voice activated input or a touch screen display, such as used on many conventional personal digital assistants.

From the foregoing description, it will be readily seen that a wide variety of other uses fall within the scope of the application. For example, in the preferred embodiment described, information indicative of the source at which a particular music recording being played is preferably associated with an input on the communications device 12, such that activation of that input establishes a communications link with the source for the purpose of purchasing a music recording. However, in accordance with an additional aspect of the invention, a concert schedule of the artist or group that recorded the song being played may be accessed at the source, for the purpose of buying concert tickets. Accordingly, upon hearing a particular song, a user of communications device 12 can activate a single input and establish a communications link with a source for purchasing concert tickets. It should be understood that the communications link may be a voice communications link or, alternatively, may be a voice and/or data communications link, such that the tickets may be purchased electronically. In particular, while the concert information may be available at the described source, it should be understood and appreciate that additional data may be encoded in the data stream, and associated with a different input, such that activation of a first input establishes a communications link with a first source at which the music recording may be purchased, while activation of a second input establishes a communications link with a second source at which concert tickets may be purchased. It should be understood that the purchasing features of the present invention may be utilized on wired or wireless PCs and computing stations as well as via wireless links. It should also be understood that, while the invention has been described with respect to music or sound recordings, various features of the invention are, applicable to recordings of other types, such as video recordings.

Figure 10:
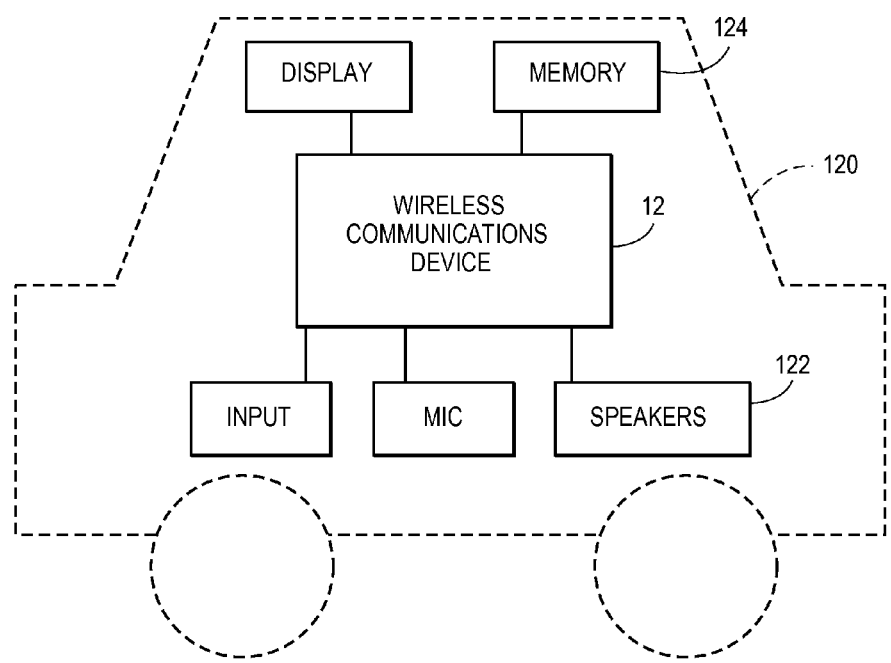
FIG. 10 is an illustration of a vehicular communications system for playing music in accordance with the principles of the present invention.

With reference now to FIG. 10, an alternative embodiment of the present invention, is illustrated and described. In particular, in the embodiment of FIG. 10, the wireless communications device 12 is incorporated in a vehicle. Thus, in such an instance, each of the components of the wireless communications device, such as the processor, memory, buffer, input, display, microphone, speaker, etc. may not be encased within the same housing. In fact, it is preferred that a plurality of speakers 122 are utilized, and spaced about the vehicle in a conventional fashion. Additionally, it is preferred that the memory 124 has much greater storage capacity than in a portable, handheld wireless communications device. In this regard, the memory may be one or more burnable CDs. The remaining aspect of this embodiment of the present invention is similar to those described above, and need not be reiterated here. In summary, the wireless communications device may be used to download selected, encoded music recordings and played via the vehicle speakers, or to stream a real time encoded broadcast. Preferably, the wireless communications device is also a voice communications device, such that voice connections may be made with the device, as well. It should be understood and appreciated that, in this vehicular embodiment, that a portable wireless communications device may be utilized in conjunction with in vehicle components, such that the wireless communications device communicates (such as by the cable connection) with one or more speakers, a storage unit, and/or an input.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

The invention claimed is:

1. A system comprising:
   a source of digital media recordings;
   a mobile communications device, wherein said mobile communications device is used by a user and comprises an operating system, a memory, a wireless transmitter, a wireless receiver, and a digital media player; and
   a personal storage unit of the user, wherein said personal storage unit enables the user to access with said mobile communications device a directory comprising at least titles of a plurality of digital media recordings that have been acquired by the user,
   wherein, when the user is in the process of purchasing a digital media recording from said source using said mobile communications device, said system enables said mobile communications device to be used by the user to input a selection of a choice between at least (i) a first available option and (ii) a second available option that is an alternative to said first available option, wherein a selection by the user of said first available option causes said digital media recording to download from said source to said memory of said mobile communications device, and wherein a selection by the user of said second available option results in said digital media recording not downloading to said mobile communications device and enables said mobile communications device to be used to subsequently select, from said directory of acquired digital media recordings, to download said digital media recording from said source to said mobile communications device.

2. The system as set forth in claim 1, wherein said system further enables the user to select to have a physical, playable medium comprising the purchased digital media recording mailed to a physical address of the user.

3. The system as set forth in claim 1, wherein said purchased digital media recording comprises music content.

4. The system as set forth in claim 1, wherein said purchased digital media recording comprises video content.

5. The system as set forth in claim 1, wherein said system further comprises a personal computing device, wherein said personal storage unit is accessible by the user using said personal computing device, wherein the user uses said personal computing device to select from said directory said purchased digital media recording, and wherein said system transmits said selected, purchased digital media recording to said personal computing device.

6. The system as set forth in claim 1, wherein said personal storage unit comprises an account.

7. The system as set forth in claim 1, wherein said personal storage unit comprises a home media unit.

8. A system comprising:
   a source of digital media recordings;
   a mobile communications device, wherein said mobile communications device is used by a user and comprises an operating system, a memory, a wireless transmitter, a wireless receiver, and a digital media player; and
   a personal storage unit of the user, wherein said personal storage unit enables the user to access with said mobile communications device a directory comprising at least titles of a plurality of digital media recordings that have been acquired by the user,
   wherein the user uses said mobile communications device to input a request to purchase a digital media recording from said source,
   wherein, when the user is in the process of making said purchase of said digital media recording from said source, said system enables said mobile communications device to be used by the user to input a selection of a choice between at least (i) a first available option and (ii) a second available option that is an alternative to said first available option, wherein a selection by the user of said first available option causes said digital media recording to download from said source to said memory of said mobile communications device, and wherein a selection by the user of said second available option results in said digital media recording not downloading to said mobile communications device and enables said mobile communications device to be used to subsequently select, from said directory of acquired digital media recordings, to download said digital media recording from said source to said mobile communications device.

9. The system as set forth in claim 8, wherein said system further enables the user to select to have a physical, playable medium comprising the digital media recording mailed to a physical address of the user.

10. The system as set forth in claim 8, wherein said digital media recording comprises music content.

11. The system as set forth in claim 8, wherein said digital media recording comprises video content.

12. The system as set forth in claim 8, wherein said system further comprises a personal computing device, wherein said personal storage unit is accessible by the user using said personal computing device, wherein the user uses said personal computing device to select from said directory said digital media recording, and wherein said system transmits said selected digital media recording to said personal computing device.

13. The system as set forth in claim 8, wherein said personal storage unit comprises an account.

14. The system as set forth in claim 8, wherein said personal storage unit comprises a home media unit.

15. A method comprising:
providing a source of digital media recordings;
providing a mobile communications device, wherein said mobile communications device comprises an operating system, a memory, a wireless transmitter, a wireless receiver, and a digital media player and is used by a user;
providing, to the user of the mobile communications device, a personal storage unit, wherein said personal storage unit enables the user to access with said mobile communications device a directory comprising at least titles of a plurality of digital media recordings that have been acquired by the user;
processing a request, input by the user using said mobile communications device, to purchase a digital media recording from said source; and
enabling, when the user is in the process of purchasing said digital media recording from said source using said mobile communications device, said mobile communications device to be used by the user to input a selection of a choice between at least (i) a first available option and (ii) a second available option that is an alternative to said first option, wherein a selection by the user of said first available option causes said digital media recording to download from said source to said memory of said mobile communications device, and wherein a selection by the user of said second available option results in said digital media recording not downloading to said mobile communications device and enables said mobile communications device to be used to subsequently select, from said directory of acquired digital media recordings, to download said digital media recording from said source to said mobile communications device.

16. The method as set forth in claim 15, wherein said method further enables the user to select to have a physical, playable medium comprising the digital media recording mailed to a physical address of the user.

17. The method as set forth in claim 15, wherein said method further comprises providing a personal computing device and enabling the personal computing device of the user to access said personal storage unit, receiving from said personal computing device a selection input by the user of said digital media recording, and transmitting said selected digital media recording to said personal computing device.

18. The method as set forth in claim 15, wherein said providing a personal storage unit comprises providing an account to the user.

19. The method as set forth in claim 15, wherein said providing a personal storage unit comprises providing a home media unit to the user.

* * * * *